(12) United States Patent
Luckmann

(10) Patent No.: US 10,820,467 B2
(45) Date of Patent: Nov. 3, 2020

(54) SUSPENSION FOR A MOWER

(71) Applicant: Launy Luckmann, Sønderborg (DK)

(72) Inventor: Launy Luckmann, Sønderborg (DK)

(73) Assignee: CNH Industrial America LLC, New Holland, PA (US)

(*) Notice: Subject to any disclaimer, the term of this patent is extended or adjusted under 35 U.S.C. 154(b) by 110 days.

(21) Appl. No.: 16/032,847

(22) Filed: Jul. 11, 2018

(65) Prior Publication Data
US 2019/0037762 A1 Feb. 7, 2019

(30) Foreign Application Priority Data
Jul. 14, 2017 (BE) .................................. 2017/5504

(51) Int. Cl.
| A01B 63/106 | (2006.01) |
| A01D 34/66 | (2006.01) |
| A01B 63/111 | (2006.01) |
| A01D 34/74 | (2006.01) |
| F16F 9/00 | (2006.01) |
| A01B 63/10 | (2006.01) |
| A01D 67/00 | (2006.01) |
| A01D 34/64 | (2006.01) |
| F15B 15/24 | (2006.01) |
| A01D 101/00 | (2006.01) |

(52) U.S. Cl.
CPC ............ *A01B 63/111* (2013.01); *A01B 63/10* (2013.01); *A01D 34/64* (2013.01); *A01D 34/661* (2013.01); *A01D 34/74* (2013.01); *A01D 67/00* (2013.01); *A01D 67/005* (2013.01); *F16F 9/00* (2013.01); *A01D 2101/00* (2013.01); *F15B 15/24* (2013.01)

(58) Field of Classification Search
CPC ... A01B 59/048; A01B 59/064; A01B 59/066; A01B 63/111; A01B 63/10; A01D 34/64; A01D 34/661; A01D 34/74; A01D 34/662; A01D 34/28; A01D 67/00; A01D 67/005; F16F 9/00; F15B 15/24
USPC ........................... 56/14.9, 15.8; 60/413, 469
See application file for complete search history.

(56) References Cited

U.S. PATENT DOCUMENTS

| 3,869,861 A | | 3/1975 | Case | |
| 4,930,801 A | * | 6/1990 | Gillund | A01B 59/048 172/298 |
| 4,970,848 A | * | 11/1990 | Neuerburg | A01D 75/185 56/10.4 |
| 5,901,538 A | * | 5/1999 | Vohl | A01D 34/662 144/34.1 |

(Continued)

FOREIGN PATENT DOCUMENTS

| DE | 8701093 | 3/1987 |
| DE | 202010011803 | 5/2011 |

(Continued)

*Primary Examiner* — Robert E Pezzuto
(74) *Attorney, Agent, or Firm* — Rebecca L. Henkel; Rickard K. DeMille

(57) ABSTRACT

A suspension for a mower includes a stationary part, a movable part, and at least one cutting unit. The moveable part is connected to the stationary part via a hydraulic actuator such that an actuation of the hydraulic actuator displaces the movable part in relation to the stationary part. Displacement of the movable part includes a vertical component of displacement of the movable part. At least one cutting unit is mechanically connected to the movable part.

16 Claims, 11 Drawing Sheets

(56) References Cited

U.S. PATENT DOCUMENTS

| | | | |
|---|---|---|---|
| 6,125,619 A * | 10/2000 | Wolff | A01D 34/28 |
| | | | 56/14.9 |
| 9,408,340 B2 * | 8/2016 | Halter | A01B 63/10 |
| 2015/0107211 A1 | 4/2015 | Halter et al. | |

FOREIGN PATENT DOCUMENTS

| | | |
|---|---|---|
| EP | 0368020 | 5/1990 |
| EP | 0465790 | 5/1992 |
| EP | 2174538 | 4/2010 |

\* cited by examiner

SUSPENSION FOR A MOWER

PRIORITY CLAIM

This application claims priority to Belgium Application Serial Number 2017/5504 BELG, filed Jul. 14, 2017, entitled "A Suspension for a Mower", which is incorporated by reference herein in its entirety for all purposes.

FIELD OF THE INVENTION

The present invention generally relates to the field of mowers. More specifically the present invention relates in a first aspect to a suspension for a mower.

In a second aspect the present invention relates to an agricultural implement comprising a suspension according the first aspect of the invention.

In a third aspect the present invention relates to an agricultural vehicle comprising a suspension according the first aspect of the invention.

In a fourth aspect the present invention relates to a use of a suspension according to the first aspect of the invention; or of an agricultural implement according to the second aspect of the invention; or of an agricultural vehicle according the third aspect of the invention for mowing a field.

BACKGROUND OF THE INVENTION

Within the field of horticulture and agriculture it is customary to cut grass, either for purpose of maintaining a field or for the purpose of utilizing the hay originating from the cut grass, such as for fodder. Also, road side grass areas are occasionally mowed in order to improve traffic safety.

Professional mowers provide for cutting grass in a rather large width relative to the direction of movement of the mower. The cutting itself is being performed by one or more cutting units mounted on the mower. The cutting unit typically comprises cutting knives rotating around a vertical axis or around a horizontal axis.

Various types of mowers exist. In the boom type of mowers, a number of cutting units is/are suspended on a movable boom and the mower moves while cutting the grass located in a transverse position relative to the vehicle.

In a front mower, a number of cutting units are arranged in front of a self-propelled vehicle in a transverse direction.

Alternative a mowing implement may be towed behind a tractor or other type of vehicle or may be suspended on the three-point linkage of a tractor.

Most types of mowers for professional use comprise a suspension for suspending the cutting units. The suspension comprises a stationary part and a movable part. The stationary part of the suspension is fastened to the rest of the mowing vehicle or implement and the movable part of the suspension is able to be displaced in a vertical direction, relative to the stationary part, of the implement. The movable part of the suspension carries one or more cutting units.

The displacement of the movable part is typically brought about by one or more hydraulic actuators which upon application of a hydraulic pressure is able to lift and lower the movable part, and thereby also the cutting units, relative to the stationary part.

Thereby the mower is able to shift its configuration between a transport mode in which the cutting units are lifted from the ground and a working mode in which the cutting units are lowered so as to touch the ground.

In one type of prior art mowers the stationary part of the suspension is suspending the movable part of the suspension, which carries the cutting units, by a single-acting hydraulic actuator and a spring.

In this type of suspension the single-acting hydraulic actuator allows for raising the movable part of the suspension, and thereby also the cutting units, relative to the ground.

Hereby the height of the cutting units can be adjusted and in a transport situation a full raise of the movable part of the suspension and thereby also of the cutting units makes transport easier.

In a working mode, where the movable part of the suspension is lowered during mowing, the hydraulic pressure of the hydraulic actuator is set to a floatation pressure allowing the cutting units to slide above the surface of the ground being mowed The spring on the other hand acts so as to counteract the gravitational force of the moving part of the suspension and enables the movable part of the suspension to attain a mode in which the cutting units are able to perform a soft bouncing, up and down, as they follow the topography of the field ground which is being mowed upon being slit over the ground.

Although such systems have provided for suspending the cutting units in mowers for many years, these systems nevertheless suffers from some disadvantages.

One such disadvantage is caused by the hysteresis effect of the hydraulic actuator used in such systems resulting in some degree of "sluggishness" of the movement of the piston in relation to attaining a "correct" equalization position of the piston, when being balanced between the force exerted on the movable part of the suspension by gravity on the one hand and the counteracting force exerted by the spring on the other hand.

Hydraulic actuators provide a unidirectional force, either by expansion or by contraction, and allow for exerting great forces in a very reliable manner with a minimum of components.

A typical single-acting hydraulic actuator comprises a barrel having a closed end (cap end) and an opposite open end (head end). A piston is arranged in the interior of the barrel and the piston is connected to a piston rod which extends in an axial direction out of the barrel.

Providing a hydraulic pressure to the interior of the barrel at the cap end thereof results in an expansive reaction of the piston. In this way the movable part of the suspension of a mower is raised from the ground.

In order to ensure that the single-acting hydraulic actuator is efficient and does not leak hydraulic fluid, a sealing between the piston rod and the axial head end of the barrel provides a tight seal between these entities. Further, one or more sealings at the cylindrical surface of the piston provides for a tight seal between the piston and the inner surface of the barrel.

However, these seals securing a fluid tight actuator come at the price of hysteresis due to friction, as mentioned above.

Moreover, the spring itself, which is responsible for providing the force counteracting the force of gravity in the prior art suspension systems, will contribute to hysteresis in the suspension.

The presence of sluggishness in the mower suspension has the consequence that a certain amount of inaccuracy as to the vertical position of the cutting units of the suspension will result. That is, when the cutting units return to a lower rest position after having been allowed to move up and down in a vertical direction, that rest position will vary from one cycle of movements to the next.

Hence, the rest position of the cutting units of the suspension which rest position is being balanced between the forces exerted by gravity on the one hand and the counteracting force exerted by the spring on the other hand is not an exact or constant position. Rather, this rest position of the cutting units varies from one cycle of up and down movement to the next.

Accordingly, a correct setting of the cutting height of the cutting units of the mower is rendered difficult.

Therefore, in the prior art suspension mechanisms operated in a floatation mode, where one or more cutting units is/are being attached to a movable part and being suspended in a stationary part by a hydraulic actuator, the cutting units will not be able to return to the same constant rest position after having been subjected to movement in a vertical direction.

The difficulties in adjusting the settings of such a suspension and mower ultimately has the consequence that a non-optimum work quality is being obtained in a working situation by the corresponding cutting units and mower.

Accordingly a need persists for a suspension for a mower which overcomes the disadvantages of the prior art as set forth above.

It is an objective of the present invention to provide a hydraulic actuator and entities and uses thereof which alleviate or even eliminate the disadvantages of the prior art as outlined above.

BRIEF DESCRIPTION OF THE INVENTION

This objective is achieved by the present invention in its first, second, third and fourth aspect respectively.

Accordingly, the present invention relates in a first aspect to a suspension for a mower wherein said suspension in the orientation intended for use during mowing, comprises:
  a stationary part;
  a movable part;
  a hydraulic actuator;
  one or more cutting units;
wherein said movable part is being connected to said stationary part via said hydraulic actuator in such a way that an actuation of said hydraulic actuator implies a displacement of said movable part in relation to said stationary part, wherein said displacement of said movable part comprises a vertical component of displacement of said movable part; and wherein said one or more cutting units is/are mechanically connected to said movable part;
characterized in that said hydraulic actuator comprises:
  a barrel comprising a closed axial cap end and an open axial head end;
  a plunger piston comprising a first axial end and a second axial end;
  a loose piston having a first axial surface and a second axial surface;
wherein said plunger piston is being arranged in the interior of said barrel at the open axial head end thereof in such a way that said first axial end of said plunger piston is being arranged within the interior of said barrel and in such a way that said second axial end of said plunger piston extends axially out of said open axial head end of said barrel;
wherein said plunger piston at said first axial end thereof comprises a piston end element having a first surface pointing towards the closed axial cap end of said barrel and a second surface pointing towards the open head end of said barrel;
wherein said piston end element is having dimensions in a direction perpendicular to an axial direction of said plunger piston which correspond to the internal dimensions, in the same direction, of said barrel;
wherein said loose piston is being arranged within said interior of said barrel between said closed axial cap end of said barrel and said first surface of said piston end element; thereby defining a first compartment and a second compartment in the interior of said barrel; wherein said first compartment being confined between said axial cap end of said barrel and said first axial surface of said loose piston; and wherein said second compartment being confined between said second axial surface of said loose piston and said first surface of said piston end element;
wherein said interior of said barrel comprises a third compartment; said third compartment being confined between said second surface of said piston end element and said open axial head end of said barrel;
wherein said barrel at said axial cap end thereof comprises a first opening for providing a hydraulic pressure into said first compartment of said interior of said barrel; and
wherein said hydraulic actuator comprises a second opening for providing a hydraulic pressure into said second compartment and/or into said third compartment of said interior of said barrel;
wherein said hydraulic actuator is configured in such a way that said second compartment of the interior of said barrel is being in fluid connection with said third compartment of the interior of said barrel.

In a second aspect the present invention relates to an agricultural implement comprising a suspension according to the first aspect of the present invention.

In a third aspect the present invention relates to an agricultural vehicle comprising a suspension according the first aspect of the invention.

In a fourth aspect the present invention relates to a use of a suspension according to the first aspect of the invention; or of an agricultural implement according to the second aspect of the invention; or of an agricultural vehicle according the third aspect of the invention for mowing a field, such as an agricultural field or a horticultural field.

The present invention in its various aspects provides for an improved suspension for a mower having less internal friction and accordingly less hysteresis when the hydraulic actuator is being configured in a flotation mode, where one or more cutting units are being slit or dragged over the ground of a field.

Moreover, the suspension for a mower according to the present invention allows obtaining an essentially constant load or effective weight of the one or more cutting units being suspended by the suspension over a wide range of working heights thereof. Such effect ultimately results in improved mowing quality performed by the mower comprising the inventive suspension.

Furthermore, the present invention in its various aspects provides for reduced weight of a suspension for a mower by utilizing the inventive hydraulic actuator.

BRIEF DESCRIPTION OF THE FIGURES

FIG. 5b is a perspective view of the embodiment of the suspension illustrated in FIG. 5a.

FIG. 6b is a perspective view of the embodiment of the suspension illustrated in FIG. 6a.

DETAILED DESCRIPTION OF THE INVENTION

Figure 1:
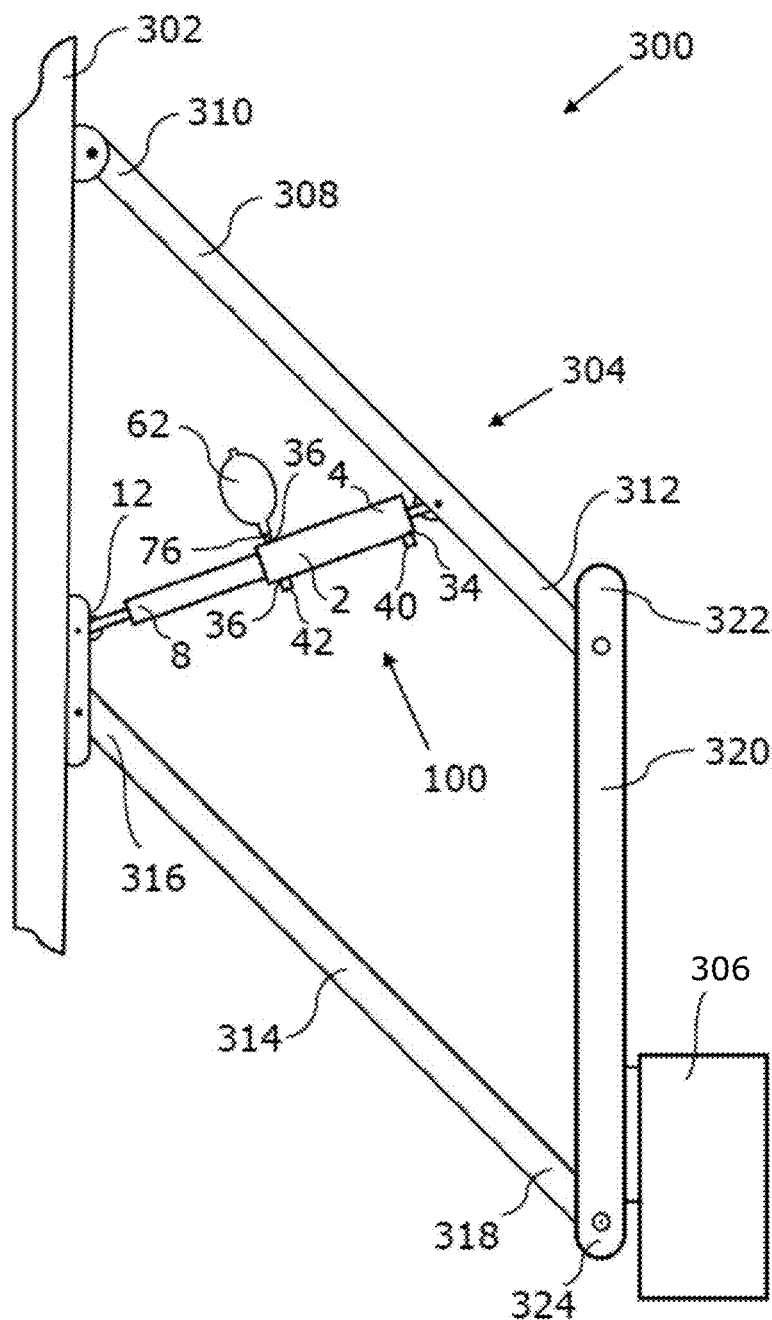
FIG. 1 is a schematic view illustrating the principles of the working mode of the suspension according to the first aspect of the present invention.

In a first aspect the present invention relates to a suspension for a mower wherein said suspension in the orientation intended for use during mowing, comprises:
- a stationary part;
- a movable part;
- a hydraulic actuator;
- one or more cutting units;

wherein said movable part is being connected to said stationary part via said hydraulic actuator in such a way that an actuation of said hydraulic actuator implies a displacement of said movable part in relation to said stationary part, wherein said displacement of said movable part comprises a vertical component of displacement of said movable part; and wherein said one or more cutting units is/are mechanically connected to said movable part;
characterized in that said hydraulic actuator comprises:
- a barrel comprising a closed axial cap end and an open axial head end;
- a plunger piston comprising a first axial end and a second axial end;
- a loose piston having a first axial surface and a second axial surface;

wherein said plunger piston is being arranged in the interior of said barrel at the open axial head end thereof in such a way that said first axial end of said plunger piston is being arranged within the interior of said barrel and in such a way that said second axial end of said plunger piston extends axially out of said open axial head end of said barrel;
wherein said plunger piston at said first axial end thereof comprises a piston end element having a first surface pointing towards the closed axial cap end of said barrel and a second surface pointing towards the open head end of said barrel;
wherein said piston end element is having dimensions in a direction perpendicular to an axial direction of said plunger piston which correspond to the internal dimensions, in the same direction, of said barrel;
wherein said loose piston is being arranged within said interior of said barrel between said closed axial cap end of said barrel and said first surface of said piston end element; thereby defining a first compartment and a second compartment in the interior of said barrel; wherein said first compartment being confined between said axial cap end of said barrel and said first axial surface of said loose piston; and wherein said second compartment being confined between said second axial surface of said loose piston and said first surface of said piston end element;
wherein said interior of said barrel comprises a third compartment; said third compartment being confined between said second surface of said piston end element and said open axial head end of said barrel;
wherein said barrel at said axial cap end thereof comprises a first opening for providing a hydraulic pressure into said first compartment of said interior of said barrel; and
wherein said hydraulic actuator comprises a second opening for providing a hydraulic pressure into said second compartment and/or into said third compartment of said interior of said barrel;
wherein said hydraulic actuator is configured in such a way that said second compartment of the interior of said barrel is being in fluid connection with said third compartment of the interior of said barrel.

Providing the suspension for a mower of the first aspect of the present invention with a hydraulic actuator as defined in claim 1 provides certain advantages.

The hydraulic actuator is provided with a loose piston which partitions the interior of the barrel of the hydraulic actuator into a first compartment and a second compartment. Further, the hydraulic actuator is provided with a plunger piston having a piston end element which partitions the interior of the barrel of the actuator into that second compartment and a third compartment. In the hydraulic actuator the second compartment and the third compartment are in fluid connection, thereby making it possible to apply a dynamic hydraulic pressure into the first compartment of the hydraulic actuator and to apply a static hydraulic pressure which is in fluid connection with a hydraulic accumulator.

This has the advantage that the extension of the plunger piston can be determined by the dynamic pressure applied to the first compartment and that once an extension of the plunger piston has been settled, a spring effect of the plunger piston can be attained by applying a static hydraulic pressure to the second or the third compartment of the interior of the barrel of the hydraulic actuator; the spring action being provided by a hydraulic accumulator which is being in fluid connection with the second compartment or the third compartment of the interior of the barrel of the hydraulic actuator. The real advantage of the inventive hydraulic actuator is that a considerably lower sluggishness of the hydraulic actuator as caused by friction and hysteresis is attained. Ultimately this leads to an improved mowing quality of a mower comprising the suspension of the first aspect of the present invention.

In the present description and in the appended claims the term "stationary part" of a suspension shall be construed to mean a part of a suspension which during use for mowing is configured for being fixed to an agricultural vehicle or an agricultural implement and which, during use of the suspension is fixed or stationary in relation to that agricultural vehicle or an agricultural implement.

In the present description and in the appended claims the term "movable part" of a suspension shall be construed to mean a part of a suspension which during use for mowing is not fixed in relation to an agricultural vehicle or an agricultural implement and which, during use of the suspension is configured to be movable in relation to a stationary part of the suspension and thereby also in relation to that agricultural vehicle or agricultural implement.

In the present description and in the appended claims the term "agricultural vehicle" shall be construed to mean a vehicle which is self-propelled and thereby capable of engaging into a forward and/or backward movement without the need of power from an external vehicle.

In the present description and in the appended claims the term "agricultural implement" shall be construed to mean an apparatus which is not self-propelled and therefore not capable of engaging into a forward and/or backward movement without power being supplied from an external source.

In the present description and in the appended claims the term "expansion of a hydraulic actuator" shall be construed to mean that the plunger piston of said hydraulic actuator is performing a displacement, relative to said barrel, in a direction out of said barrel.

In the present description and in the appended claims the term "contraction of a hydraulic actuator" shall be construed to mean that the plunger piston of said hydraulic actuator is performing a displacement, relative to said barrel, in a direction into said barrel.

In the present description and in the appended claims the term "actuation of a hydraulic actuator" shall be construed to mean either expansion or contraction of said hydraulic actuator.

In one embodiment of the suspension according to the first aspect of the present invention said hydraulic actuator is being connected to said stationary part and said movable part in such a way that an expansion of said hydraulic actuator effects a raising of said movable part relative to said stationary part; and in such a way that a contraction of said hydraulic actuator effects a lowering of said movable part, relative to said stationary part.

This way of connecting the movable part with the stationary part allows for using the hydraulic actuator, when equipped with an hydraulic accumulator, as a "hydraulic spring".

In one embodiment of the suspension according to the first aspect of the present invention at least part of said movable part is being pivotally suspended in said stationary part, thereby allowing said movable part, or a part thereof, upon actuation of said hydraulic actuator, to pivot around a pivot axis.

In one embodiment of this embodiment said pivot axis is being essentially horizontal.

Such modes of suspension provide a sturdy design and yet allows for providing the movable part of the suspension with a sufficient lifting range when used in a mower.

In one embodiment of the suspension according to the first aspect of the present invention said movable part of said suspension comprises parallelogrammic elements forming a parallelogram, wherein said suspension is being configured in such a way that a predefined direction relative to one of said one or more cutting units attains essentially the same angle, in relation to said stationary part, irrespective of the degree of expansion of said hydraulic actuator.

This design is simple and still allows for providing the movable part of the suspension with a sufficient lifting range when used in a mower.

In one embodiment of the suspension according to the first aspect of the present invention said axial head end of said hydraulic actuator is being mechanically connected to said movable part of said suspension; and wherein said axial cap end of said hydraulic actuator is being mechanically connected to said stationary part of said suspension.

In one embodiment of the suspension according to the first aspect of the present invention said axial head end of said hydraulic actuator is being mechanically connected to said stationary part of said suspension; and wherein said axial cap end of said hydraulic actuator is being mechanically connected to said movable part of said suspension.

These two modes of mounting the hydraulic actuator allows for using the hydraulic actuator as lifting means for the movable part on the one hand, and as "hydraulic spring" on the other hand.

In one embodiment of the suspension according to the first aspect of the present invention said stationary part of said suspension comprises a stationary arm; and said movable part of said suspension comprises:
  a pivoting element comprising a first arm and a second arm; wherein said first arm of said pivoting element comprises a first end and a second end; and wherein said second arm of said pivoting element comprises a first end and a second end; wherein said first end of said first arm is common to said first end of said second arm;
  an auxiliary arm having a first end and a second end;
  a carrying arm having a first end and a second end;
  a carrying bracket for carrying one or more cutting units;
wherein said pivoting element at said common first end of said first arm and said first end of said second arm is being pivotally suspended at a pivoting point of said stationary arm;
wherein said auxiliary arm at its first end is being pivotally suspended in said second end of said second arm of said pivoting element;
wherein said carrying arm at a first end thereof is being pivotally suspended in said first arm of said pivoting element at a second end thereof;
wherein said carrying arm at a second end thereof is being pivotally suspended in said auxiliary arm at a second end thereof;
wherein said carrying bracket is being mechanically connected to said carrying arm;
wherein said carrying bracket is carrying one or more cutting units;
wherein said hydraulic actuator is being configured to exert a force between said stationary part and a force exerting pivoting point of said pivoting element.

In one embodiment of this embodiment said force exerting pivoting point of said pivoting element is being arranged at a position located at the second arm of the pivoting element below said pivoting point at the stationary arm and above said pivoting point of the auxiliary arm.

In one embodiment of this embodiment said cap end of said barrel of said hydraulic actuator is being pivotally suspended in a stationary bracket, wherein said stationary bracket is being fixed to said stationary arm; and wherein said second end of said plunger piston of said hydraulic actuator is being mechanically connected to a push bar at a first end thereof; and wherein a second end of said push bar is being pivotally connected to said force exerting pivoting point of said pivoting element.

In one embodiment of this embodiment said first end of said push bar comprises an oblong opening therein, and wherein said cap end of said hydraulic actuator is being pivotally suspended in said stationary bracket with a through-going pin; wherein said through-going pin is arranged in said oblong opening of said first end of said push bar.

In the latter four embodiments an extremely compact design of a suspension is attained while still providing sufficient lifting range of the movable part when used in a mower.

In one embodiment of the suspension according to the first aspect of the present invention said stationary part of said suspension comprises a stationary arm comprising an end element having a first end and a second end; wherein said movable part of said suspension comprises:

a pivoting element comprising a first arm and a second arm; wherein said first arm of said pivoting element comprises a first end and a second end; and wherein said second arm of said pivoting element comprises a first end and a second end; wherein said first end of said first arm is common to said second end of said second arm;

an auxiliary pivotally element having a first end and a second end;

a carrying arm having a first end and a second end;

a carrying bracket for carrying one or more cutting units; wherein said pivoting element at said common first end of said first arm and said second end of said second arm is being pivotally suspended at a pivoting point at said second end of said end element of said stationary arm;

wherein said auxiliary pivotally element at its first end is being pivotally suspended in a pivoting point at said first end of said end element of said stationary arm;

wherein said carrying arm at a second end thereof is being pivotally suspended in said second end of said first arm of said pivotally element;

wherein said carrying arm at a first end thereof is being pivotally suspended in said second end of said auxiliary pivotally element;

wherein said carrying bracket is being mechanically connected to said carrying arm;

wherein said carrying bracket is carrying one or more cutting units;

wherein said hydraulic actuator is being configured to exert a force between said stationary part and a force exerting pivoting point of said pivoting element.

In one embodiment of this embodiment said force exerting pivoting point of said pivoting element is being arranged at a position located on the second arm of the pivoting element at a first end thereof.

In one embodiment of this embodiment said cap end of said barrel of said hydraulic actuator is being pivotally suspended in a bracket, wherein said bracket is being fixed to said stationary arm; and wherein said second end of said plunger piston of said hydraulic actuator is being pivotally connected at said force exerting pivoting point of said pivoting element.

The latter three embodiments are alternative embodiments in which an extremely compact design of a suspension is attained while still providing sufficient lifting range of the movable part when used in a mower.

In one embodiment of the suspension according to the first aspect of the present invention one or more of said one or more cutting units each comprise one or more cutting knives for cutting grass.

In one embodiment of the suspension according to the first aspect of the present invention said cutting knives for cutting grass independently is being configured for rotation around an essentially vertical axis; or wherein said cutting knives for cutting grass independently are being configured for rotation around an essentially horizontal axis.

Such rotating knives have proved efficient for the intended purpose of cutting grass.

In one embodiment of the first aspect of the present invention said plunger piston of the hydraulic actuator of the suspension is comprising a cylindrical element between said second surface of said piston end element and said second axial end thereof, wherein the dimension of said cylindrical element in a direction perpendicular to an axial direction of said plunger piston is smaller than the dimension, in the same direction, of said piston end element.

Such a design of the plunger piston ensures a certain and/or desirable volume of the third compartment of the interior of the barrel.

In one embodiment of the first aspect of the present invention said second opening of the hydraulic actuator of the suspension is arranged at an axial head end of the barrel, thereby allowing providing a hydraulic pressure into said third compartment of said interior of said barrel.

Such an arrangement of the second opening is advantageous because it is stationary in relation to the barrel. Furthermore, this position of the second opening for providing hydraulic fluid into the interior of the barrel has shown to provide the least degree of hysteresis in the hydraulic system comprising the inventive hydraulic actuator.

In another embodiment of the first aspect of the present invention said second opening of the hydraulic actuator of the suspension is arranged at said second axial end of said plunger piston and furthermore said plunger piston is provided with a channel connecting said second opening with said first surface of said piston end element, thereby allowing providing a hydraulic pressure into said interior of said barrel via said plunger piston.

Such a location of the second opening for providing a hydraulic pressure into said interior of said barrel may in certain applications be advantageous in relation to inter alia space limiting considerations.

In one embodiment of the first aspect of the present invention said hydraulic actuator of the suspension further comprises a first connector for connecting a hydraulic hose, wherein said first connector is being arranged in said first opening, thereby allowing application of a first hydraulic pressure into said first compartment of the interior of said barrel; and/or further comprising a second connector for connecting a hydraulic hose, wherein said second connector is being arranged in said second opening, thereby allowing application of a second hydraulic pressure into said second compartment and/or said third compartment of the interior of said barrel.

Providing the openings for hydraulic pressure of the hydraulic actuator with connectors makes it easy to hook up the hydraulic actuator in a hydraulic circuit.

In one embodiment of the first aspect of the present invention said open axial head end of said barrel of said hydraulic actuator of the suspension comprises one or more seals, sealing the space between said barrel and said plunger piston.

Such seals ensure that no leaking of hydraulic fluid will take place at the open axial head end of the barrel.

In one embodiment of the first aspect of the present invention said first axial end of said plunger piston of said hydraulic actuator of the suspension is provided with one or more guides, guiding its displacement along the interior surface of said barrel.

Such guides will ensure that the piston end element will be concentrically arranged in the interior of the barrel.

In one embodiment of the first aspect of the present invention said loose piston of the hydraulic actuator of the suspension is configured in a way, inter alia by adaptation of its dimensions, so as to ensure that there is no fluid connection between said first compartment and said second compartment of the interior of said interior of said barrel.

Ensuring that the is no fluid connection between said first compartment and said second compartment of the interior of said interior of said barrel will allow concurrent use of the hydraulic actuator as an actuator on the one hand and as a spring means on the other hand.

In one embodiment of the first aspect of the present invention said hydraulic actuator of the suspension further comprises a hydraulic accumulator, wherein said hydraulic accumulator is being in fluid connection with said second compartment or said third compartment of the interior of said barrel.

In one embodiment of this embodiment said hydraulic accumulator is being spring loaded or being loaded via compressed gas.

In one embodiment of the first aspect of the present invention said hydraulic accumulator is being in fluid connection with said second compartment or said third compartment of the interior of said barrel via said second opening for hydraulic pressure.

Providing the hydraulic actuator with a hydraulic accumulator makes it possible to attain a spring effect of the hydraulic accumulator. It should be noted that the hydraulic accumulator in the general case may be arranged anywhere as long as it is in fluid connection with the hydraulic pressure being applied to the second or the third compartment of the barrel. However, the closer the accumulator is arranged to the barrel itself, the less hysteresis is encountered in a suspension comprising a hydraulic circuit comprising such hydraulic actuator and hydraulic accumulator.

In one embodiment of the first aspect of the present invention said fluid connectivity between said second compartment and said third compartment of said interior of said barrel of the hydraulic actuator of the suspension is provided by one or more channels arranged at said piston end element; such as in the form of channels extending between said first surface of said piston end element and a cylindrical surface of said plunger piston; and/or in the form of channels being arranged at a circumference of said piston end element, and connecting said second compartment with said third compartment.

These designs of the channels connecting the second compartment with the third compartment have shown to provide adequate fluid connectivity between these two compartments for the intended purpose.

In one embodiment of the first aspect of the present invention the area of a projection of said first surface of said piston end element of the hydraulic actuator of the suspension onto a plane perpendicular to an axial direction of said plunger piston is being greater than the area of a projection of said second surface of said piston end element onto the same plane.

Hereby is ensured that application of hydraulic pressure into the second compartment or the third compartment of the interior of the barrel, which due to the fluid connectivity between the second compartment and the third compartment of the interior of the barrel will lead to the same hydraulic pressure in these two compartments nevertheless will result in an expansion of the plunger piston in such a situation because the hydraulic pressure in the second compartment will act on a larger area of the piston end element, compared to the situation in respect of the third compartment.

In one embodiment of the first aspect of the present invention said hydraulic actuator of the suspension, at its two opposite axial ends, comprises connecting means for fixing said actuator, at said two opposite axial ends thereof, to two different entities.

Such connection means allows easy mounting of the hydraulic actuator in a suspension.

In one embodiment of the first aspect of the present invention the interior cross-section of said barrel of the hydraulic actuator of the suspension is being circular; or being a polygon, such as rectangular, for example a square; or being triangular, hexagonal or octagonal.

In a second aspect the present invention relates to an agricultural implement comprising a suspension according to the first aspect of the present invention.

In one embodiment of the agricultural implement according to the second aspect of the present invention said agricultural implement is being selected from the group comprising: a pulled type implement; an implement to be suspended in a three-point linkage, for either forward or reverse drive; an implement configured for mowing in front of and/or at the side of an agricultural vehicle.

The suspension of the first aspect of the present invention is very well suited for such types of implements.

In a third aspect the present invention relates to an agricultural vehicle comprising a suspension according the first aspect of the invention.

In one embodiment of the agricultural vehicle according to the third aspect of the present invention said agricultural vehicle is being selected from the group comprising: a front mower, a boom mower, a side mower.

The suspension of the first aspect of the present invention is very well suited for such types of vehicles.

In a fourth aspect the present invention relates to a use of a suspension according to the first aspect of the invention; or of an agricultural implement according to the second aspect of the invention; or of an agricultural vehicle according the third aspect of the invention for mowing a field, such as an agricultural field or a horticultural field.

Referring now to the figures for better illustrating the present invention in its various aspects, FIG. 1 is a schematic view illustrating the principles of the suspension according to the first aspect of the present invention.

FIG. 1 schematically illustrates the working principle of a suspension 300 for a mower according to the first aspect of the invention. The suspension 300 comprises a stationary part 302 and a movable part 304. The movable part 304 comprises a parallelogrammic frame. The parallelogrammic frame comprises a first beam 308 having a first end 310 and a second end 312, and a second beam 314 having a first end 316 and a second end 318.

The first end 310 of the first beam 308 and the first end 316 of the second beam 314 are pivotally suspended in the stationary part 302 of the suspension 300.

Likewise, the second end 312 of the first beam 308 and the second end 318 of the second beam 314 are pivotally suspending in a suspended element 320 at a first end 322 and a second end 324 thereof, respectively.

The suspended element 320 carries a cutting unit which in FIG. 1 schematically is merely symbolized with the rectangular item 306.

A hydraulic actuator 100 is pivotally suspended between the stationary part 302 and the first beam 308 of the suspension.

The hydraulic actuator 100 in its interior comprises a first connector 40 arranged in opening 34 for supplying hydraulic pressure into a first compartment 28 of the interior 20 of the barrel 2. A second connector 42 arranged in opening 36 allows supplying a hydraulic pressure into a third compartment 32 of the interior 20 of the barrel 2.

Also included in the hydraulic actuator is a hydraulic accumulator 62 which is in fluid connection with the third compartment 32 of the interior 20 of the barrel 2 via connector 76 and opening 36.

The internal structure of the hydraulic actuator 100 and its various compartments of the interior of the barrel 2 is described in more detail below.

Expanding the hydraulic actuator 100 will imply a lift of the suspended element 320 and hence also of the cutting unit 306, whereas a contraction of the hydraulic actuator 100 will imply a lowering of the suspended element 320 and its associated cutting unit 306.

Figure 3:
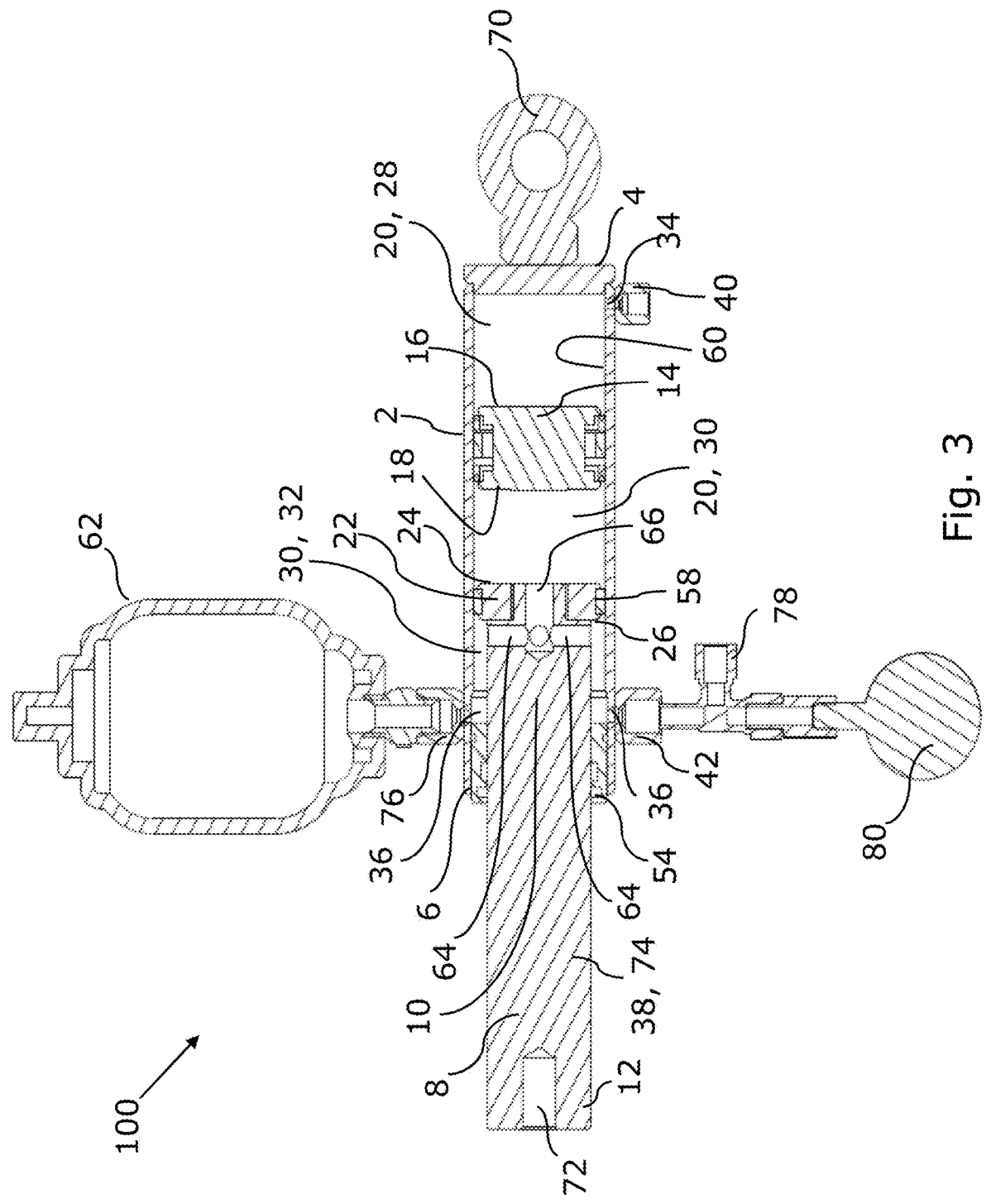
FIG. 3 is a cross-sectional view illustrating one configuration of a hydraulic actuator to be included in the suspension according to the first aspect to the present invention.
Figure 4:
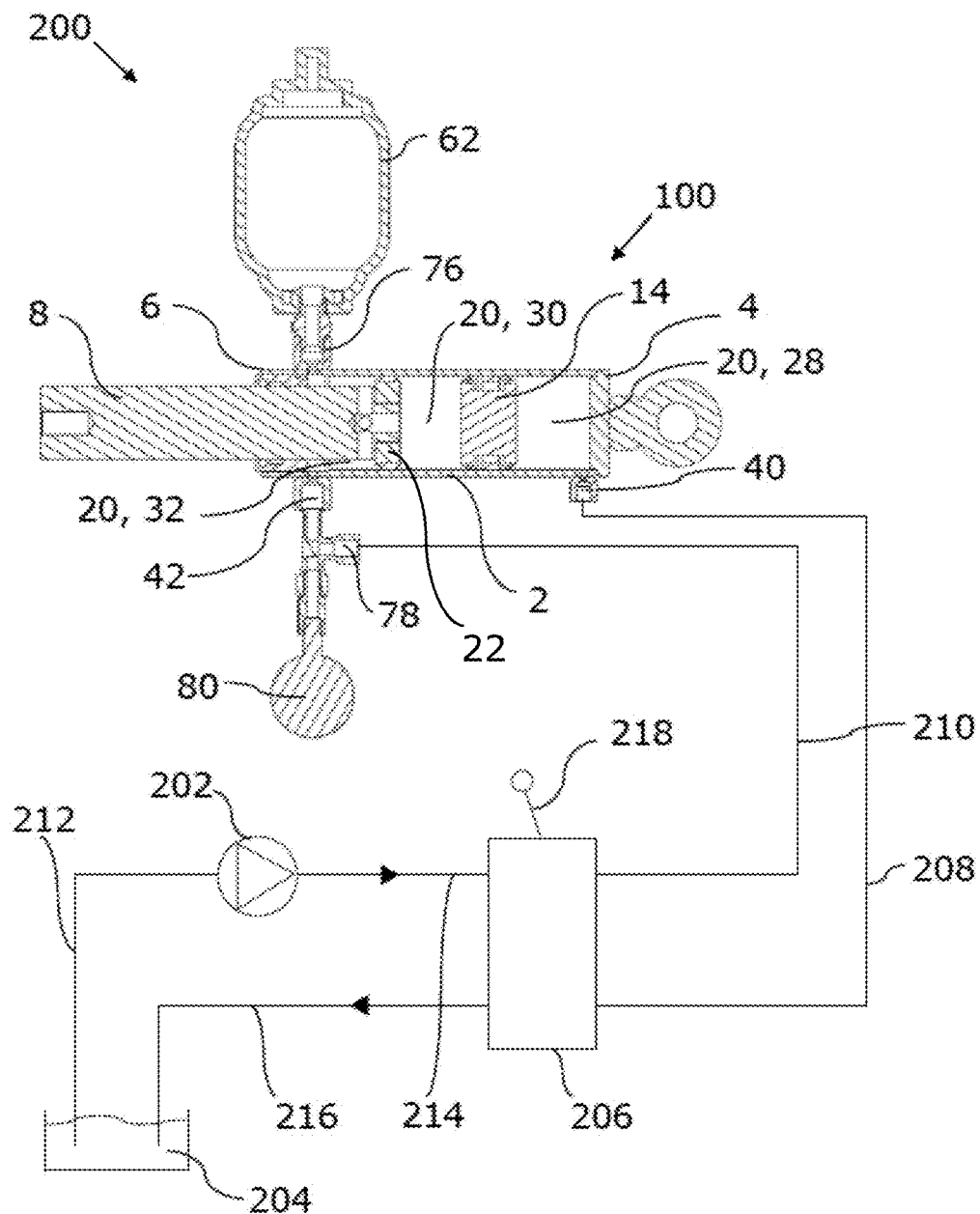
FIG. 4 is a schematic view illustrating a hydraulic circuit to be used with the hydraulic actuator in the suspension according to the first aspect of present invention.

In order to fully understand the working mode of the suspension of the first aspect of the present invention we now turn to details of the hydraulic actuator. These details are illustrated in FIGS. 2, 3 and 4.

Figure 2:
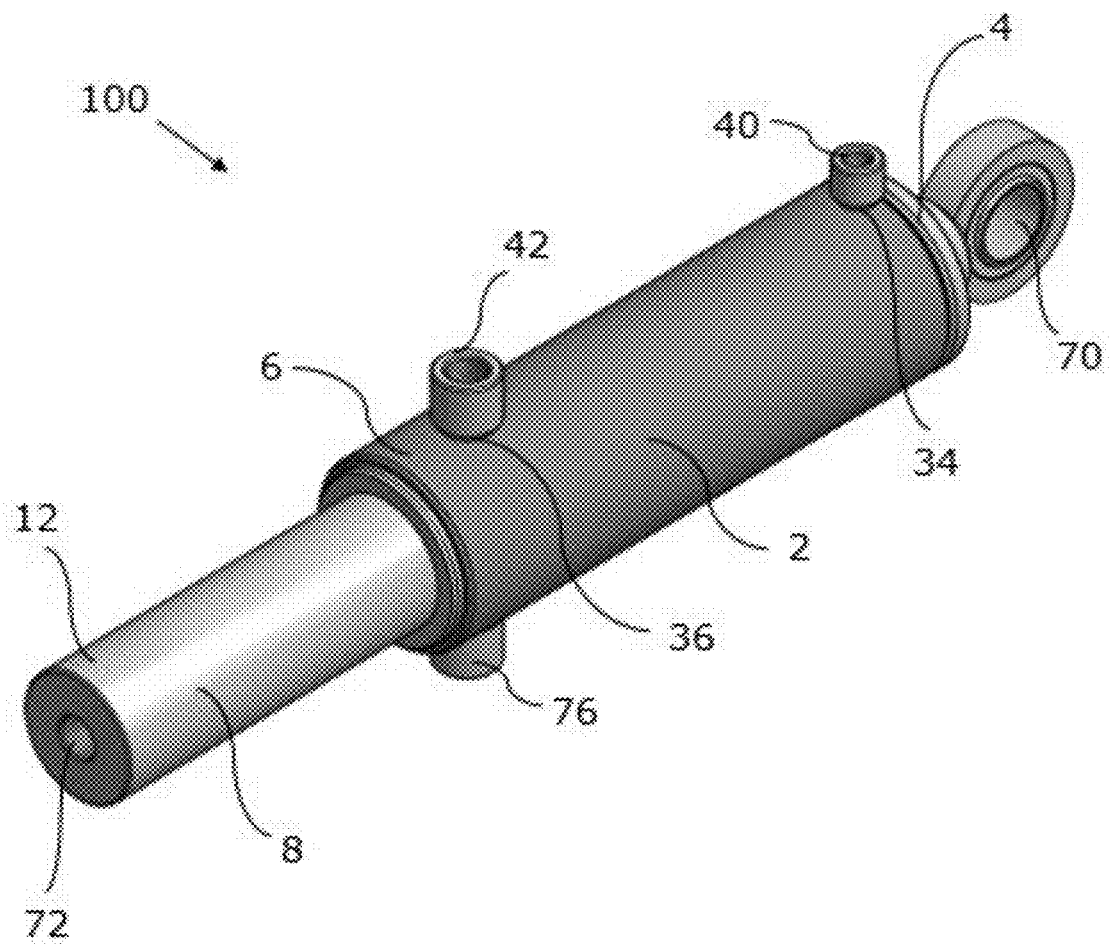
FIG. 2 is a perspective view illustrating a hydraulic actuator to be included in the suspension according to the first aspect the present invention.

FIG. 2 is a perspective view showing the hydraulic actuator to be included in the suspension 300 according to the first aspect of the present invention.

FIG. 2 shows the external parts of a hydraulic actuator 100 to be used with the suspension 300 according to the first aspect of the present invention. The hydraulic actuator 100 comprises a barrel 2. The barrel 2 is having a closed axial cap end 4 and an open axial head end 6. In the open axial head end 6 is arranged a plunger piston 8. The plunger piston 8 comprises a first axial end 10 which is accommodated in the interior of the barrel 2 and accordingly not visible in FIG. 2. The plunger piston 8 also comprises a second axial end 12 extending axially out of said open axial head end 6 of the barrel 2.

The barrel at the axial cap end 4 thereof comprises a first opening 34 for providing a hydraulic pressure into a first compartment of said interior of the barrel. This opening has been provided with a first connector 40 for a hydraulic hose.

In the opposite axial head end 6, the barrel comprises a second opening 36 for providing a hydraulic pressure into the third compartment of the interior of the barrel. This opening has been provided with a second connector 42 for a hydraulic hose.

In fact, in the embodiment illustrated in FIG. 1 there are provided two connectors 42 and 76 arranged at the open head end of the barrel 2 which may be used for providing a hydraulic pressure into the third compartment 32 of the interior 20 of the barrel 2.

In the two opposite ends of the hydraulic actuator connecting means 70,72 have been provided for allowing easy connection of these two opposite ends to separate entities.

FIG. 3 is a cross-sectional view illustrating one embodiment of a hydraulic actuator to be included in the suspension 300 according to the first aspect to the present invention.

FIG. 3 illustrates the interior structure of the hydraulic actuator 100. Again it is seen that the hydraulic actuator 100 comprises a barrel 2 having a closed axial cap end 4 and an open axial head end 6. The plunger piston 8 is arranged in the interior 20 of the barrel which accommodates the first axial end 10 of the plunger piston 8. The first axial end 10 of the plunger piston 8 comprises a piston end element 22.

The piston end element 22 comprises a first surface 24 pointing towards the closed axial cap end 4 of the barrel and a second surface 26 pointing towards the head end 6 of the barrel.

The piston end element 22 is having dimensions in a direction perpendicular to an axial direction of the plunger piston 8 which correspond to the internal dimensions, in the same direction, of the barrel. The piston end element 22 has been provided with a guide 58.

It is seen in FIG. 3 that a loose piston 14 has been arranged within the interior 20 of the barrel 2 between the closed axial cap end 4 of the barrel and the first surface 24 of the piston end element 22; thereby defining a first compartment 28 and a second compartment 30 in the interior 20 of the barrel.

The first compartment 28 is being confined between the axial cap end 4 of the barrel 2 and the first axial surface 16 of the loose piston 14.

The second compartment 30 is being confined between the second axial surface 18 of the loose piston 14 and the first surface 24 of the piston end element 22.

Moreover, the interior 20 of the barrel 2 also comprises a third compartment 32.

The third compartment 32 is being confined between the second surface 26 of the piston end element 22 and said open axial head end 6 of said barrel 2.

The division of the interior 20 of the barrel 2 into three compartments allows for either applying a hydraulic pressure to the first compartment 28 of the interior via the opening 34, thereby providing an expansion of the plunger piston 8 out of the barrel 2; or alternatively to apply a hydraulic pressure to the second compartment 30 or the third compartment 32 of the interior 20 of the barrel 2 via the opening 36.

It is also seen in FIG. 3 that the piston end element 22, in a direction perpendicular to the axial direction, is having a maximum dimension which is greater than the maximum dimension, in the same direction, of a remainder of the plunger piston 8, which comprises a cylindrical element 38 having a surface 74. Hereby a desired volume of the third compartment 32 in the interior 20 of the barrel 2 is ensured.

Besides, the piston end element 22 may also act as an end stop preventing the plunger piston to be displaced all the way out of the barrel 2 in an expanded state.

The loose piston 14 is loose in the sense that it is allowed to slit along the axial direction of the first and second compartment 28,30 of the interior 20 of the barrel 2, depending on which side thereof is subjected to the highest hydraulic pressure. The loose piston 14 allows for separating a hydraulic pressure in the first compartment 28 of the interior 20 of the barrel from a hydraulic pressure being present in the second compartment 30 of the interior 20 of the barrel 2.

The hydraulic actuator is configured in such a way that the second compartment 30 of the interior 20 of the barrel is being in fluid connection with the third compartment 32 of the interior 20 of said barrel 2. This has been accomplished by providing the plunger piston 8 and the piston end element 22 of the plunger piston 8 with channels 64,66 which connect the second compartment 30 of the interior 20 of the barrel 2 with the third compartment 32 of the interior 20 of the barrel 2.

The channels 64,66 extend between the first surface 24 of the piston end element 22 and a cylindrical surface 74 of the plunger piston.

These channels 64,66 allow hydraulic fluid to flow from the third compartment 32 of the interior 20 of the barrel 2 to the second compartment 30 of the interior 20 of the barrel, and vice versa.

Alternatively, channels 64,66 may be arranged at the perimeter of the piston end element 22 and connecting the second compartment 30 with the third compartment 32 of the interior 20 of the barrel 2.

Guide 58 provides a guide for the displacement in the interior of the barrel of the plunger piston at the piston end element thereof.

A second connector 42 for applying a hydraulic pressure to the third compartment 32 of the interior 20 of the barrel is provided near the open head end 6 of the barrel 2. This connector 42 is connected to a hydraulic pressure gauge 80 and a connector 78 for a hydraulic hose.

A third connector 76 is provided near the head end 6 of the barrel 2. This connector 76 is connected to a hydraulic accumulator 62 and is being in fluid connection with the third compartment 32 of the interior 20 of the barrel 2 via opening 36.

In FIG. 3 the plunger piston 8 has been displaced a certain distance out of the barrel 2. This has been accomplished by supplying a hydraulic pressure to the connector 40 in the first opening 34 near the cap end 4 of the barrel. This hydraulic pressure will cause the loose piston to be displaced to the left and to push the plunger piston 8 in a direction out of the barrel.

In case in the situation depicted in FIG. 3 the hydraulic pressure applied to the first compartment 28 of the interior 20 of the barrel 2 is set in a flotation mode, allowing free flowing of hydraulic fluid in and out of opening 34, and in case a hydraulic pressure is applied to connector 78 in order to provide a hydraulic pressure to the third compartment 32 of the interior 20 of the barrel 2, the loose piston will be displaced to the right because an increased hydraulic pressure in the third compartment 32 will cause hydraulic fluid to flow from the third compartment 32 to the second compartment 30 of the interior 20 due to the channels 64,66 and hence this hydraulic pressure in the second compartment 30 will displace the loose piston 14.

By supplying a hydraulic pressure to the connector 42 via connector 78, the hydraulic accumulator 62 will provide a spring effect in the sense that an external force acting on the plunger piston 8 in a direction into the barrel will cause hydraulic fluid being present in the second compartment 30 to flow through the channels 64,66 into the third compartment and further into the hydraulic accumulator 62. The hydraulic accumulator 62 will thereby contain an increased amount of hydraulic fluid and because of this the accumulator 62 responds with a reaction in which the hydraulic pressure being present in that hydraulic accumulator attempts to make hydraulic fluid flow back into the third compartment 32, and into the second compartment 30, which will result in a reactive force attempting to displace the plunger piston out of the barrel 2, thereby counteracting the external force exerted on the plunger piston in a direction into the barrel.

As the hydraulic actuator 100 of the first aspect of the present invention may only necessitate providing the plunger piston 8 with the guide 58 at the circumference of the piston end element and the seal 54 at the head end of the barrel, in contrast to the provision of more seals of the prior art hydraulic actuators, the actuator 100 used in the inventive suspension 300 will in its floatation mode, in which a static hydraulic pressure is provided into the third compartment 32 of the interior 20 of the barrel 2, be prone to much less friction and hence less hysteresis, upon displacement of the plunger piston 8 in relation to the barrel 2.

Accordingly, applying a dynamic hydraulic pressure to the first compartment 28 of the interior 20 of the barrel 2 allows for controlling the extension of displacement of the plunger piston 8 out of the barrel 2 of the hydraulic actuator 100, whereas applying a static hydraulic pressure to the second compartment 30 or third compartment 32 of the interior 20 of the barrel 2 allows for attaining a spring effect of the plunger piston 8 in relation to a force acting thereon.

In case the hydraulic actuator illustrated in FIG. 3 is used in the suspension for a mower according to the first aspect of the present invention, and in case the hydraulic actuator 100 is in a mode in which hydraulic pressure has been applied to the third compartment 32 of the interior 20 of the barrel 2, in which the hydraulic pressure in the first compartment is in a flotation mode, thus allowing hydraulic fluid to freely flow in and out of the first opening 34, applying a hydraulic pressure to the third compartment 32 of the interior 20 of the barrel 2 will cause hydraulic fluid to flow via channels 64,66 from the third compartment 32 of the interior 20 into the second compartment 30 of the interior 20. This in turn will force the loose piston 14 to start moving in the direction towards the cap end 4 of the barrel.

Further, as the area of the first surface 24 of the piston end element 22 is greater than the area of the second surface 26 of the piston end element 22, increasing the hydraulic pressure in the third compartment and thereby also in the second compartment (due to channels 64,66) will effect an expansion of the plunger piston 8 in a direction out of the barrel.

As the third compartment 32 of the interior 20 of the barrel is fluidly connected to a hydraulic accumulator 62, a spring effect will be attained in the sense that, at a given equal and static hydraulic pressure in the second compartment 30 and the third compartment 32, caused by that hydraulic actuator, the spring effect will be able to counteract an external force exerted on the plunger piston 8 in a direction into the barrel 2.

In case a force is exerted on the plunger piston 8 in an axial direction into the barrel 2, the hydraulic accumulator 62, which is in fluid connection with the third compartment 32, will be acting as a spring so that the plunger piston 8 counteracts a displacement of the plunger piston 8 into the barrel by providing a force to the plunger piston 8 in a direction out of the barrel 2.

FIG. 4 is a schematic view illustrating a hydraulic circuit 200 which may be used with the suspension 300 according to the first aspect of the present invention.

FIG. 4 shows the hydraulic circuit 200 which comprises a hydraulic actuator 100 as defined in respect of the suspension 300 according to the first aspect of the present invention.

The hydraulic actuator 100 comprises a barrel 2 into the interior of which is arranged a plunger piston 8 and a loose piston 14. The interior 20 of the barrel 2 is divided into a first compartment 28 and a second compartment 30 and a third compartment 32 as described above. A connector 40 arranged at the closed cap end 4 of the barrel 2 allows application of a hydraulic pressure to the first compartment 28 of the interior 20 of the barrel 2.

Likewise, a connector 42 arranged at the open head end 6 of the barrel 2 thereof allows application of a hydraulic pressure to the third compartment 32 of the interior 20 of the barrel 2.

Also, a hydraulic accumulator 62 is in fluid connection with the third compartment 32 of the interior 20 of the barrel 2 via connector 76, and additionally, a hydraulic pressure gauge 80 is connected to the connector 42 thereby allowing monitoring the hydraulic pressure in the third compartment 32 of the interior 20 of the barrel 2.

The hydraulic actuator is being connected to the hydraulic hose 208 for supplying a pressurized hydraulic fluid to the connector 40 and thereby supplying a hydraulic pressure into the first compartment 28 of the interior 20 of the barrel. Furthermore, a hydraulic hose 210 is connected to the connector 42, via connector 78, for supplying a pressurized hydraulic fluid into the third compartment 32 of the interior 20 of the barrel.

The controlling of the hydraulic actuator 100 is brought about by the hydraulic control valve 206 via the lever 218.

A hydraulic pump 202 is being supplied with hydraulic fluid from the reservoir 204 via the hydraulic hose 212. The hydraulic fluid is pressurized in the pump 202 and expelled therefrom to the hydraulic control valve 206 via hydraulic hose 214.

Depending on the position of the lever 218, the hydraulic control valve 206 is able to supply pressurized hydraulic fluid via hose 208 to the connector 40 and thereby into the first compartment 28 of the interior 20 of the barrel 2. This will cause the hydraulic actuator to expand in that the plunger piston 8 will be displaced in a direction out of the barrel 2 of the actuator 100.

In another position of the lever 218 the hydraulic valve is able to supply pressurized hydraulic fluid via hose 210 to the connector 42 via connector 78, and thereby into the third compartment 32 of the interior 20 of the barrel 2. This will effect an increased pressure in the hydraulic accumulator 38 which in turn will effect that the plunger piston 8 will experience a "spring effect" as explained above in the sense that an external force attempting to displace the plunger piston 8 into the barrel 2, will be counteracted by a reaction force, attempting to displace the plunger piston 8 in a direction out of the barrel 2.

The hydraulic hose 216 is a return hose connecting the hydraulic control valve 206 with the reservoir for hydraulic liquid 204.

The control valve 206 may be manually operated or automatically operated.

Now, returning to FIG. 1 again. Upon application of a hydraulic pressure into the first compartment 28 of the interior 20 of the barrel 2 of the hydraulic actuator 100, the suspended element 320 with its associated cutting unit 306, are being lifted. This represents a non-working position for the suspended element 320 and the cutting unit 306. In this configuration the mower comprising the suspension 300 is ready for a transport situation.

In a work position the suspended element 320 is lowered to the extent that the cutting unit 306 touches the ground and the pressure supplied to the first compartment 28 of the interior 20 of the barrel 2 is set to flotation, allowing hydraulic fluid to freely flow in and out of the first compartment 28 via connector 40 in opening 34. Subsequently, the hydraulic pressure supplied to the third compartment 32 of the interior 20 of the barrel 2 of the hydraulic actuator, via opening 36, is increased until the suspended element 320 and its associated cutting unit 306 starts to be lifted again. Then, the hydraulic pressure supplied to the third compartment 32 of the interior 20 of the barrel 2 is lowered a little and kept static. In this position the suspended element 320 with its associated cutting unit 306 are in a mode in which it is allowed to be dragged over the surface of the ground and yet being allowed to be raised and lowered a certain distance commensurate with an downwardly or upwardly directing force acting on the cutting unit 306.

Upon upholding a static hydraulic pressure in the third compartment 32 of the interior 20, via the hydraulic accumulator 62, the hydraulic pressure in the hydraulic accumulator 62 will provide some lifting force to the cutting unit 306, while still allowing the cutting unit 306 to be displaced in a vertical direction.

Depending on the exact geometry of the suspension 300 and of the movable part 304 it is possible to attain a suspension in which one can obtain essentially a constant lifting force as encountered by the cutting unit 306 within a predefined range of working heights. Such a working height may in the general case be 10-120 cm or more, such as 20-110 cm, for example 30-100 cm, e.g. 40-90 cm, such as 50-80 cm or 60-70 cm.

In this respect an essentially constant lifting force as encountered by the cutting unit 306 within a predefined working height shall be construed to mean an effective weight of the one or more cutting units collectively varying within a range of 1-30%, such as 2-25%, e.g. 3-24%, such as 4-23%, for example 5-22%, e.g. 6-21%, such as 7-20%, e.g. 8-19%, for example 9-18%, such as 10-17%, for example 11-16%, e.g. 12-15% or 13-14%.

It should be noted that although in FIGS. 3 and 4 it is illustrated that the hydraulic accumulator 62 is directly mounted on the barrel 2 of the hydraulic actuator 100, this need not necessarily be so. The hydraulic accumulator 62 may be arranged anywhere on the suspension 300 or the associated mower as long as the hydraulic accumulator is in fluid connection with either the second compartment 30 or the third compartment 32, or both, of the interior 20 of the barrel 2.

Figure 5A:
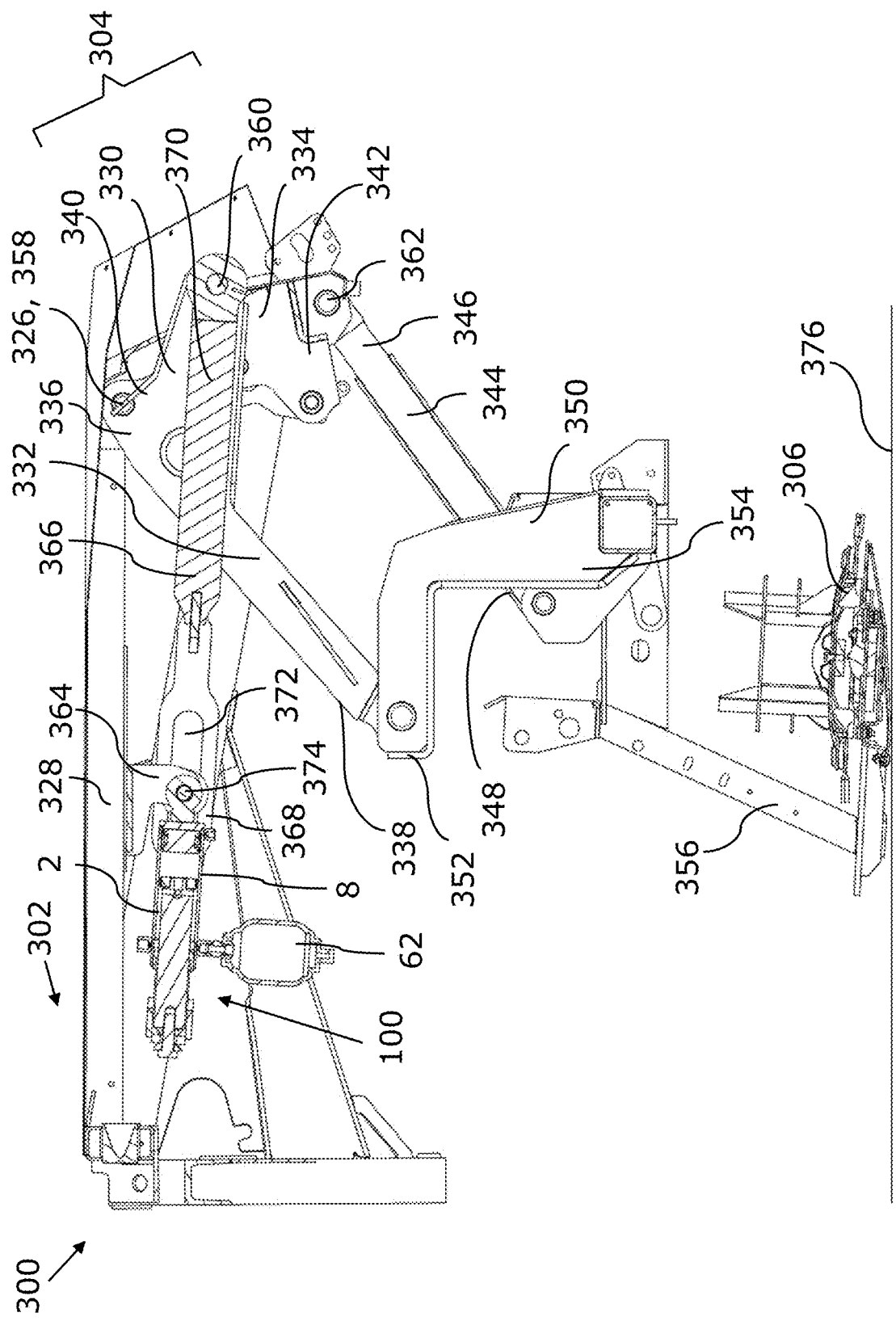
FIG. 5a is a side view of an embodiment of the suspension of the first aspect of the present invention, arranged in a working mode.

FIG. 5a is a side view showing a specific embodiment of a suspension according to the first aspect of the present invention.

The suspension, in the orientation intended for use during mowing, comprises a stationary part 302 and a movable part 304. On the movable part a number of cutting units 306 are arranged. The suspension also comprises a hydraulic actuator 100.

In the embodiment illustrated in FIG. 5a the movable part 304 is being connected to the stationary part 302 via the hydraulic actuator 100 in such a way that an actuation of said hydraulic actuator implies a displacement of the movable part 304 in relation to the stationary part 302, wherein the displacement of the movable part comprises a vertical component of displacement.

The type of hydraulic actuator used in the embodiment of the suspension of FIG. 5a is of the design disclosed above with reference to FIGS. 2, 3 and 4.

The movable part 304 of the suspension illustrated in FIG. 5a comprises a pivoting element 330. The pivoting element 330 is being suspended in a stationary arm 328 in a pivoting point 358 defining a horizontal pivoting axis 326.

The pivoting element 330 comprises a first arm 332 and a second arm 334, each extending from the pivoting point 358 thereof.

The first arm 332 of the pivoting element 330 comprises a first end 336 and a second end 338.

The second arm 334 of the pivoting element comprises a first end 340 and a second end 342.

It can be seen in FIG. 5a that the first end 336 of the first arm 332 is common to the first end 340 of the second arm 334.

The movable part 304 of the suspension illustrated in FIG. 5a also comprises an auxiliary arm 344 having a first end 346 and a second end 348; a carrying arm 350 having a first end 352 and a second end 354; and a carrying bracket 356 which carries a number of cutting units 306.

The auxiliary arm 344 at its first end 346 is being pivotally suspended in the second end 342 of the second arm 334 of the pivoting element 330.

The carrying arm 350 at a first end 352 thereof is being pivotally suspended in the second end 338 of the first arm 332 of the pivoting element 330.

The carrying arm 350 at a second end 354 thereof is being pivotally suspended in the auxiliary arm 344 at a second end 348 thereof.

Finally, the carrying bracket 356 is being mechanically connected to the carrying arm 350.

In the embodiment illustrated in FIG. 5a, the hydraulic actuator 100 is being configured to exert a force to a force exerting pivoting point 360 of the pivoting element 330.

This is brought about by pivotally suspending the cap end 4 of the barrel 2 of the hydraulic actuator 100 in a stationary bracket 364 which is being fixed to the stationary arm 328, and in such a way that the second end 12 of the plunger piston 8 of the hydraulic actuator 100 is being mechanically connected to a push bar 366 at a first end 368 thereof; and in such a way that the second end 370 of the push bar 366 is being pivotally connected to the force exerting pivoting point 360 of said pivoting element 330.

Furthermore, as shown in FIG. 5a, the first end 368 of the push bar 366 comprises an oblong opening 372. The cap end 4 of the hydraulic actuator 100 is being pivotally suspended in the stationary bracket 364 via a through-going pin 374 which is arranged in the interior of that oblong opening 372 of the first end 368 of the push bar 366. Thereby a guidance of the push bar 366 is attained.

In FIG. 5a the force exerting pivoting point 360 of the pivoting element 330 is being arranged at a position located at the second arm 334 of the pivoting element below the pivoting point 358 at the stationary arm 328 and above the pivoting point 362 of the auxiliary arm 344.

In the configuration illustrated in FIG. 5a the suspension 300 is in a working mode, meaning that the moveable part 304 has been lowered to a position in which the cutting units 306 are sliding over the surface 376 of the ground of a field. In this configuration the plunger piston 8 of the hydraulic actuator is being in an almost fully contracted configuration.

Upon allowing a hydraulic pressure in the first compartment 28 of the interior 20 of the barrel 2 of the hydraulic actuator 100 to be in a "floating mode", in which hydraulic fluid is allowed to flow in and out of the first compartment via opening 34 and upon applying a hydraulic pressure in the second compartment 30 of the interior 20 of the barrel 2 of the hydraulic actuator 100, the hydraulic accumulator will act as a spring, implying a spring-like force encountered by the movable part 304 of the suspension 300, and thereby also by the cutting units 306, in an upward pointing direction of displacement.

As the hydraulic actuator 100 has been designed in such a way that the friction of mutually moving parts of the hydraulic actuator is minimized, a reduced hysteresis of the suspension will result which ultimately will lead to an improved mowing, in that the cutter units 306 more precisely and accurately return to the surface of the field to be mowed once they, due to a varying topography of the surface of the field, have been forced in an upward or downward direction. Thereby, an improved cutting quality is obtained.

Prior to a transport situation, the hydraulic pressure in the first compartment 28 of the interior 20 of the barrel 2 of the hydraulic actuator is increased. This has the effect that the plunger piston 8 of the hydraulic actuator 100 will be displaced out of the head end 6 of the barrel 2 of the hydraulic actuator. As the cap end of the barrel 2 is fixed to the stationary arm 328 of the suspension and as the plunger piston 8 of the hydraulic actuator 100 is mechanically connected to the push bar 366 the effect of an increased hydraulic pressure in the first compartment 18 of the interior of the barrel 2 is that the push bar is being pushed in a direction corresponding to the left hand side of FIG. 5a. As the pivoting element 312 is being pivotally suspended in the pivoting point 358, the result is that the movable part 304 of the suspension 300 is being lifted, and thereby the cutting units 306 are also lifted.

Figure 5B:
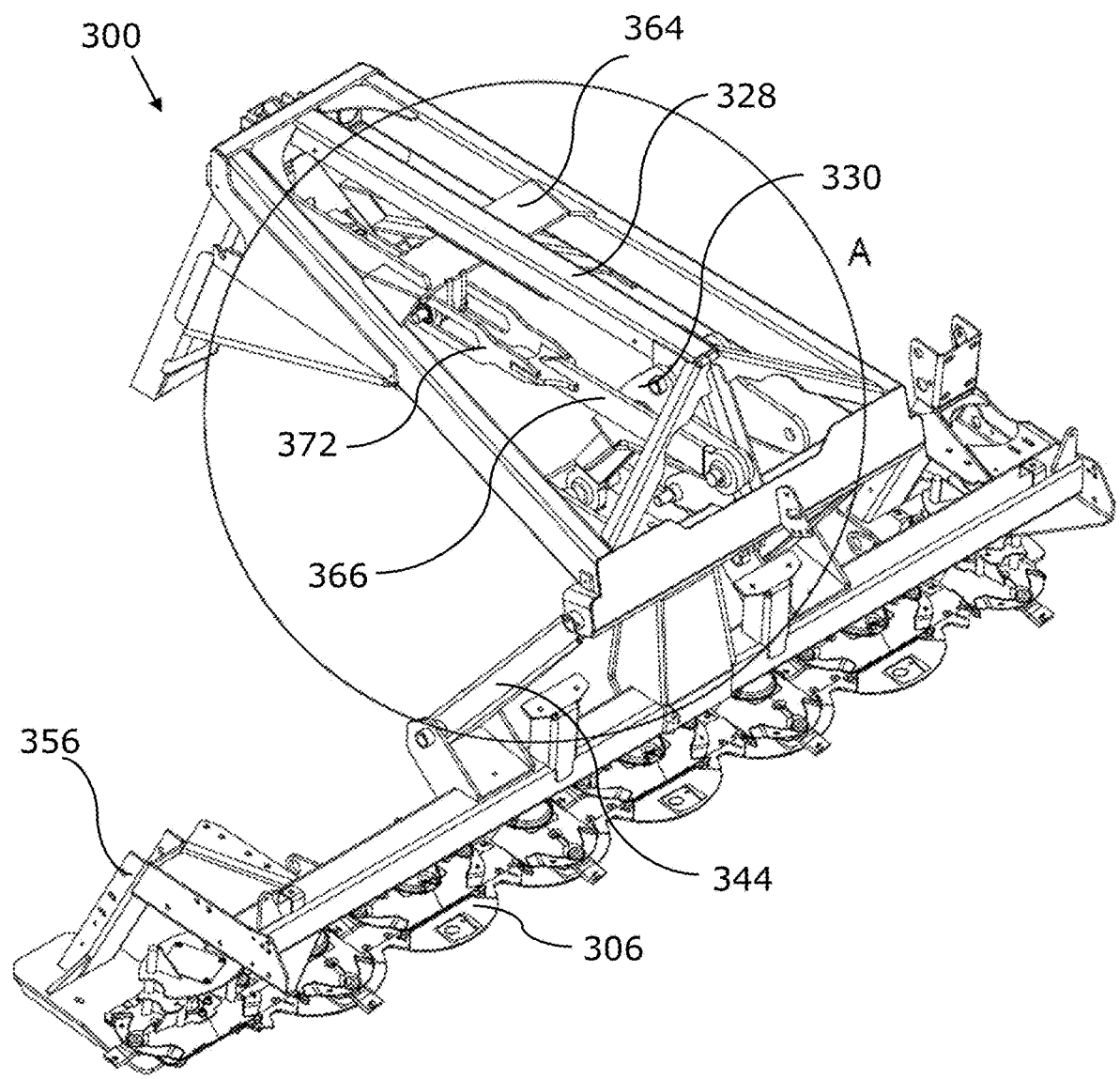
Figure 5C:
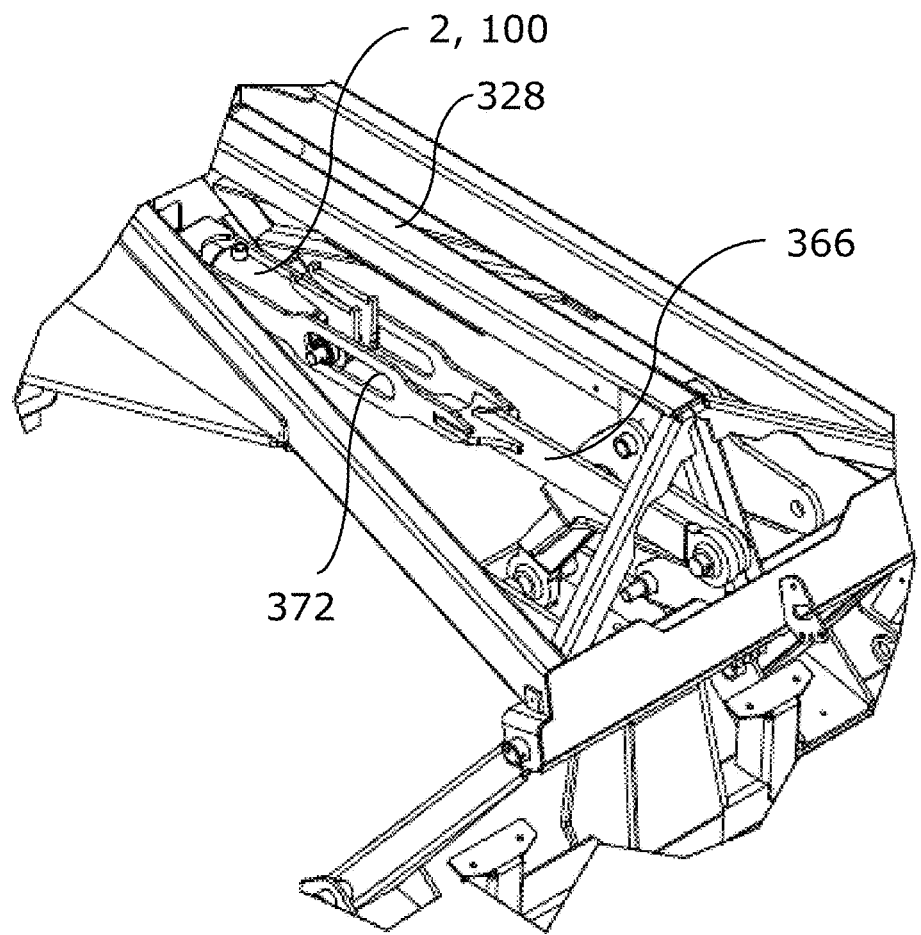
FIG. 5c is perspective close-up view of the parts of the embodiment illustrated in FIG. 5b.

FIG. 5b is a perspective view of the suspension 300 shown in FIG. 5a and FIG. 5c is a close-up illustrating parts of the suspension illustrated in FIG. 5b. FIG. 5c is shown without the stationary bracket 364 for clarification purposes FIG. 6a is a side view showing the embodiment of the suspension illustrated in FIG. 5a according to the first aspect of the present invention, however, this time in a transport or a non-working position.

Figure 6A:
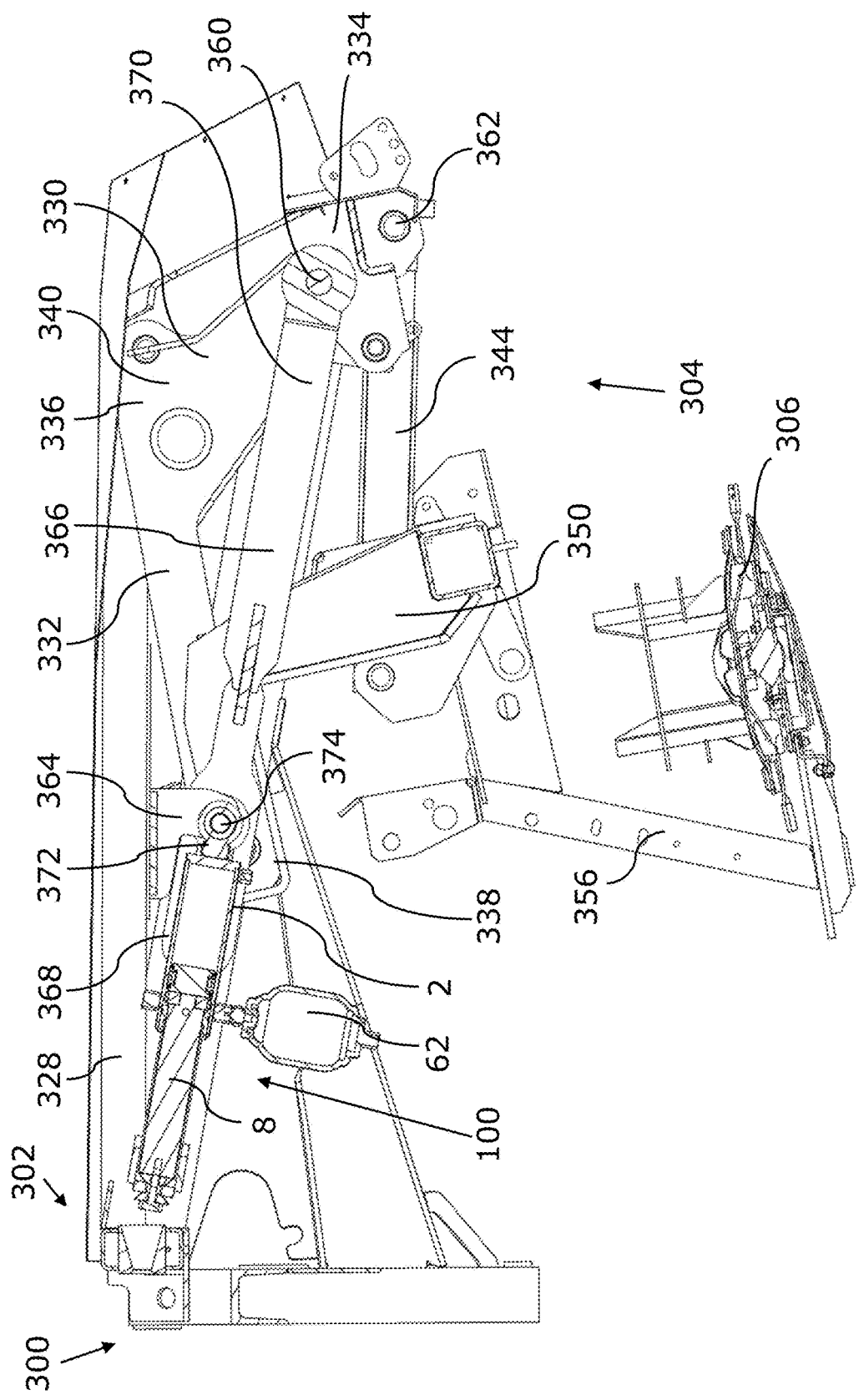
FIG. 6a is a side view of the embodiment of the suspension of the first aspect of the present invention illustrated in FIG. 5a, arranged in a transport mode.

It is seen in FIG. 6a that the hydraulic actuator 100 has been almost fully expanded which has led to a lift of the cutting units 306 via lifting of the items 332, 344, 350 and 356.

Figure 6B:
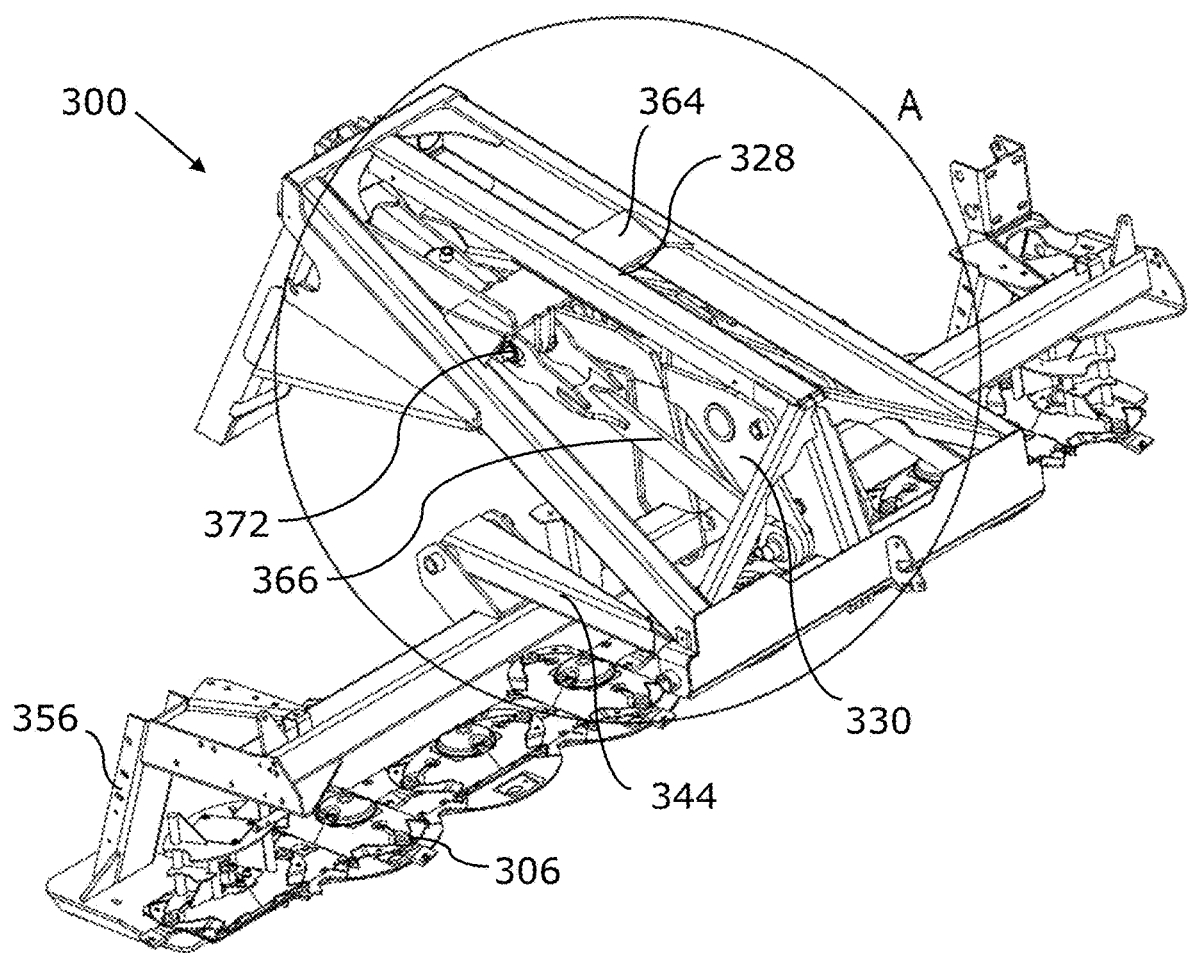
Figure 6C:
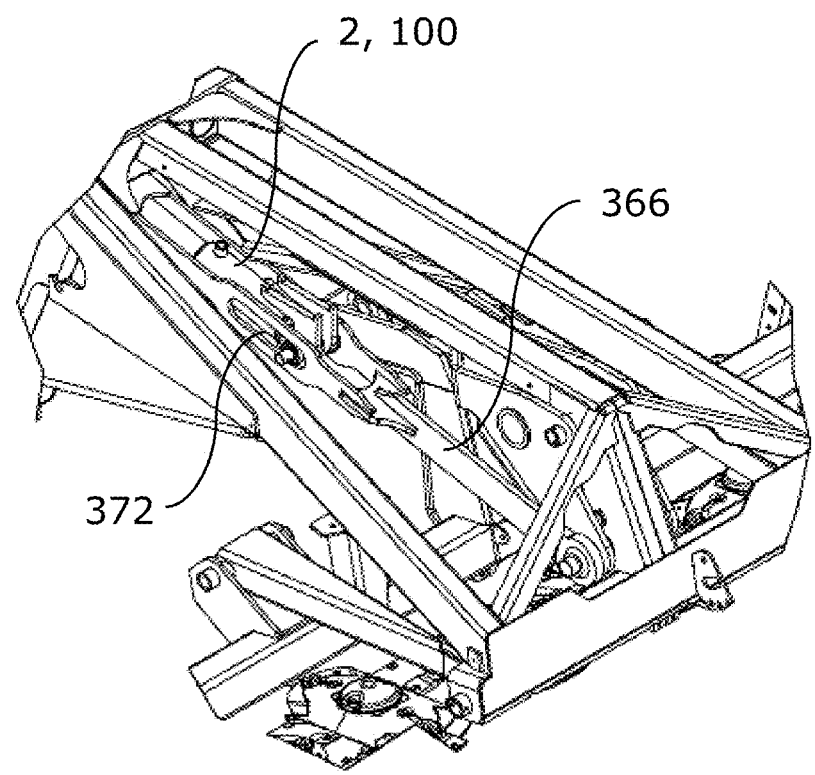
FIG. 6c is perspective close-up view of parts of the embodiment illustrated in FIG. 6b.

FIG. 6b is a perspective view of the suspension 300 as shown in FIG. 6a, again in a non-working position; and FIG. 6c is a close-up illustrating parts of the suspension illustrated in FIG. 6b. FIG. 6c is shown without the stationary bracket 364 for clarification purposes.

Figure 7:
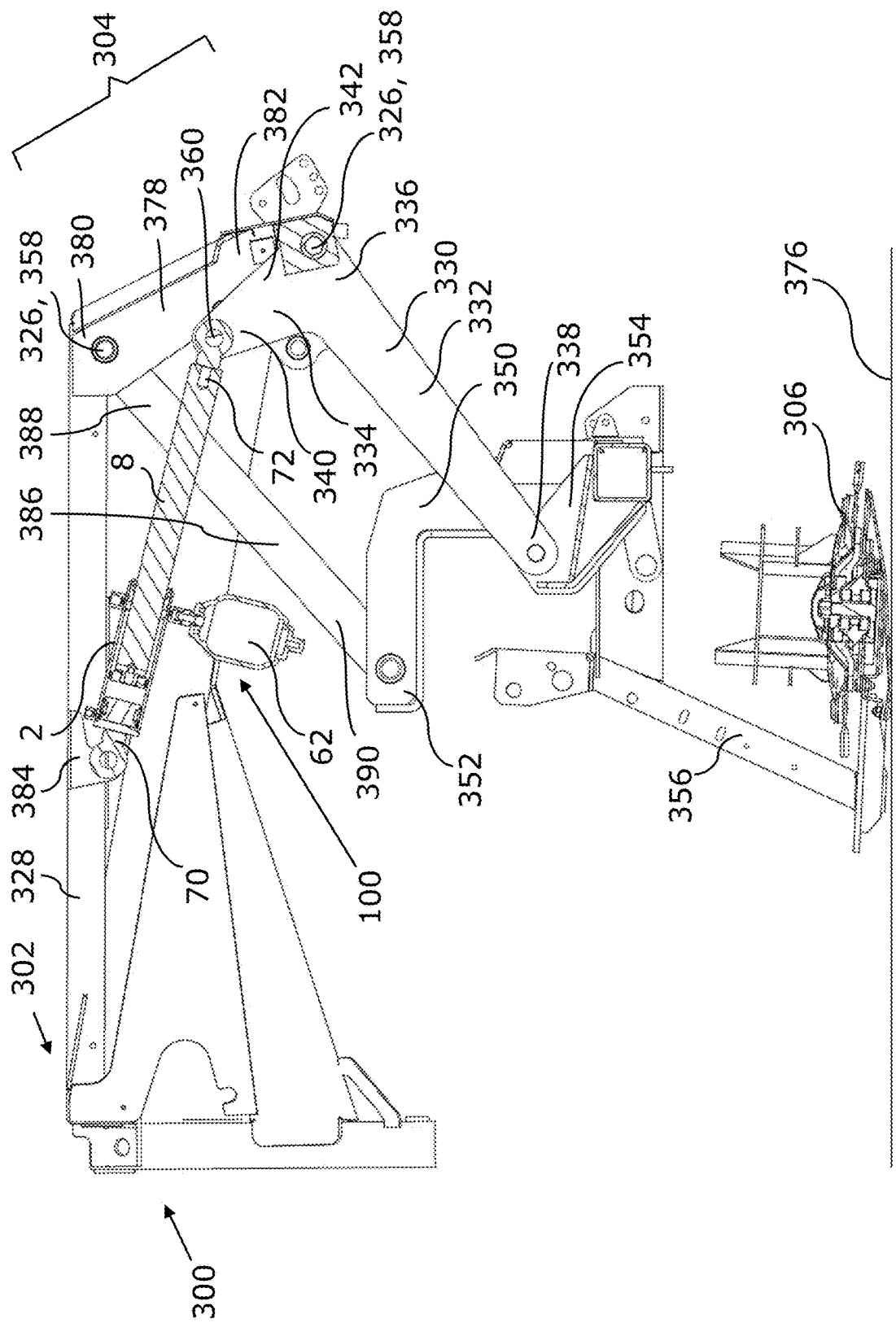
FIG. 7 is a side view of another embodiment of the suspension of the first aspect of the present invention, arranged in a working mode.

FIG. 7 is a side view of another embodiment of the suspension of the first aspect of the present invention, arranged in a working mode.

FIG. 7 shows the suspension 300 for a mower according to a first aspect of the present invention. The suspension, in the orientation intended for use during mowing, comprises a stationary part 302 and a moving part of said suspension comprises a movable part 304.

The stationary part 302 comprises a stationary arm 328 which comprises an end element 378 having a first end 380 and a second end 382.

The movable part 304 of the suspension comprises a pivoting element 330 comprising a first arm 332 and a second arm 334. The first arm 332 of the pivoting element 330 comprises a first end 336 and a second end 338. The second arm 334 of the pivoting element 330 comprises a first end 340 and a second end 342. The first end 336 of the first arm 332 is common to the second end 342 of the second arm 334.

The movable part 304 further comprises an auxiliary pivotally element 386 having a first end 388 and a second end 390, carrying arm 350 having a first end 352 and a second end 354, and a carrying bracket 356 for carrying a number of cutting units 306.

The pivoting element 330 at the common first end 336 of the first arm 332 and the second end 342 of the second arm 334 is being pivotally suspended at a pivoting point 358 arranged at the second end 382 of the end element 378 of the stationary arm 328.

In the suspension illustrated in FIG. 7 the auxiliary pivotally element 386 at its first end 388 is being pivotally suspended in a pivoting point 358 at the first end 380 of the end element 378 of the stationary arm 328.

Additionally, the carrying arm 350 at a second end 354 thereof is being pivotally suspended in the second end 338 of said first arm 332 of the pivotally element 330.

It is also seen that the carrying arm 350 at a first end 352 thereof is being pivotally suspended in the second end 390 of the auxiliary pivotally element 386.

Finally, the carrying bracket 356 is being mechanically connected to the carrying arm 350, and the carrying bracket 356 is carrying a cutting unit 306.

In the embodiment of the suspension illustrated in FIG. 7, the hydraulic actuator 100 is being configured to exert a force between said stationary part 302 and a force exerting pivoting point 360 of said pivoting element 330.

More precisely this force may be exerted to the force exerting pivoting point 360 of the pivoting element 330 which is being arranged at a position located on the second arm 334 of the pivoting element 330 at a first end 340 thereof.

It is also seen in FIG. 7 that that cap end 4 of the barrel 2 of the hydraulic actuator 100 is being pivotally suspended in a bracket 384 which is being fixed to the stationary arm 328, and that the second end 12 of the plunger piston 8 of the hydraulic actuator 100 is being pivotally connected at the force exerting pivoting point 360 of the pivoting element 330.

It is easily comprehended from FIG. 7 that an expansion of the hydraulic actuator 100 will lead to a rotation of the pivotally element 330 in a clockwise direction which in turn implies a lift of the cutting unit 306.

In analogy, if a further contraction of the hydraulic actuator 100 would be possible, this would lead to a rotation of the pivotally element 330 in an anti-clockwise direction which in turn would imply a further lowering of the cutting unit 306, supposing that this did not already touch the ground.

As the hydraulic actuator 100 which included in the suspension 300 illustrated in FIG. 7 is having the features as described above with reference to FIGS. 2, 3 and 4 it is possible to achieve the general advantages of the invention of the first aspect of the present invention also with the suspension of FIG. 7.

It should be understood that all features and achievements discussed above and in the appended claims in relation to one aspect of the present invention and embodiments thereof apply equally well to the other aspects of the present invention and embodiments thereof.

The invention claimed is:

1. A suspension for a mower positioned in an orientation for mowing, the suspension comprising:
   a stationary part;
   a movable part;
   a hydraulic actuator;
   at least one cutting unit;
   wherein the movable part is connected to the stationary part via the hydraulic actuator such that an actuation of the hydraulic actuator displaces the movable part in relation to the stationary part, wherein displacement of the movable part comprises a vertical component of displacement of the movable part, and wherein the at least one cutting unit is mechanically connected to the movable part;
   wherein the hydraulic actuator comprises:
      a barrel comprising a closed axial cap end and an open axial head end;
      a plunger piston comprising a first axial end and a second axial end;
      a loose piston comprising a first axial surface and a second axial surface; and
      a hydraulic actuator comprising a hydraulic accumulator,
   wherein the plunger piston is positioned in an interior of the barrel at the open axial head end thereof such that the first axial end of the plunger piston is positioned within the interior of the barrel such that the second axial end of the plunger piston extends axially out of the open axial head end of the barrel;
   wherein the plunger piston at the first axial end thereof comprises a piston end element having a first surface positioned towards the closed axial cap end of the barrel and a second surface positioned towards the open head end of the barrel;
   wherein the piston end element includes a dimension in a direction perpendicular to an axial direction of the plunger piston which corresponds to an internal dimension, in the same direction, of the barrel;
   wherein the loose piston is positioned within the interior of the barrel between the closed axial cap end of the barrel and the first surface of the piston end element to define a first compartment and a second compartment in the interior of the barrel, wherein the first compartment is positioned between the axial cap end of the barrel and the first axial surface of the loose piston, and wherein the second compartment is positioned between the second axial surface of the loose piston and the first surface of the piston end element;
   wherein the interior of the barrel comprises a third compartment, and the third compartment is positioned between the second surface of the piston end element and the open axial head end of the barrel;
   wherein the barrel at the axial cap end thereof comprises a first opening to provide a hydraulic pressure into the first compartment of the interior of the barrel, and wherein the hydraulic actuator comprises a second opening to provide the hydraulic pressure into at least one of the second compartment and the third compartment of the interior of the barrel;
   wherein the hydraulic actuator is configured such that the second compartment of the interior of the barrel is in a fluid connection with the third compartment of the interior of the barrel, and
   wherein the hydraulic accumulator is in a fluid connection with at least one of the second compartment and the third compartment of the interior of the barrel of the hydraulic actuator.

2. A suspension according to claim 1, wherein the hydraulic actuator is connected to the stationary part and the movable part such that an expansion of the hydraulic actuator results in a raising of the movable part relative to the stationary part, and a contraction of the hydraulic actuator results in a lowering of the movable part relative to the stationary part.

3. A suspension according to claim 1, wherein at least a part of the movable part is pivotally connected to the stationary part, allowing the at least one of the movable part and the part thereof, upon actuation of the hydraulic actuator, to pivot around a pivot axis.

4. A suspension according to claim 3, wherein the pivot axis is positioned horizontally.

5. A suspension according to claim 1, wherein the movable part of the suspension further comprises a plurality of parallelogrammic elements forming a parallelogram, wherein the suspension is configured in a predefined direction relative to the at least one cutting unit, and the suspension attains essentially a same angle in relation to the stationary part, regardless of the degree of expansion of the hydraulic actuator.

6. A suspension according to claim 1, wherein the axial head end of the hydraulic actuator is mechanically connected to the movable part of the suspension, and wherein the axial cap end of the hydraulic actuator is mechanically connected to the stationary part of the suspension.

7. A suspension according to claim 1, wherein the axial head end of the hydraulic actuator is mechanically connected to the stationary part of the suspension, and wherein the axial cap end of the hydraulic actuator is mechanically connected to the movable part of the suspension.

8. A suspension according to claim 1, wherein the stationary part of the suspension further comprises
a stationary arm; and
the movable part of the suspension further comprises:
a pivoting element comprising a first arm and a second arm, the first arm of the pivoting element including a first end and a second end, and the second arm of the pivoting element including a first end and a second end, and the first end of the first arm is connected to the first end of the second arm;
an auxiliary arm having a first end and a second end;
a carrying arm having a first end and a second end;
a carrying bracket for carrying the at least one cutting unit;
wherein the pivoting element connected to the first end of the first arm and the first end of the second arm is pivotally connected to a pivoting point of the stationary arm;
wherein the auxiliary arm at the first end thereof is pivotally connected to the second end of the second arm of the pivoting element;
wherein the carrying arm at the first end thereof is pivotally connected to the first arm of the pivoting element at the second end thereof;
wherein the carrying arm at the second end thereof is pivotally connected to the auxiliary arm at the second end thereof;
wherein the carrying bracket is mechanically connected to the carrying arm, and wherein the carrying bracket is formed to carry the at least one cutting unit; and
wherein the hydraulic actuator is configured to exert a force between the stationary part and a force exerting pivoting point of the pivoting element.

9. A suspension according to claim 8, wherein the force exerting pivoting point of the pivoting element is positioned at a position on the second arm of the pivoting element below the pivoting point at the stationary arm and above the pivoting point of the auxiliary arm.

10. A suspension according to claim 8, wherein the cap end of the barrel of the hydraulic actuator is pivotally connected to a stationary bracket, wherein the stationary bracket is fixed to the stationary arm, wherein the second end of the plunger piston of the hydraulic actuator is mechanically connected to a push bar at a first end thereof, and wherein a second end of the push bar is pivotally connected to the force exerting pivoting point of the pivoting element.

11. A suspension according to claim 10, wherein the first end of the push bar comprises an oblong opening therein, and wherein the cap end of the hydraulic actuator is pivotally connected to the stationary bracket with a through-going pin, and wherein the through-going pin is positioned in the oblong opening of the first end of the push bar.

12. A suspension according to claim 1, wherein the stationary part of the suspension further comprises
a stationary arm comprising an end element having a first end and a second end; and
the movable part of the suspension further comprises:
pivoting element comprising a first arm and a second arm, wherein the first arm of the pivoting element comprises a first end and a second end, wherein the second arm of the pivoting element comprises a first end and a second end, and wherein the first end of the first arm is connected to the second end of the second arm;
an auxiliary pivotal element having a first end and a second end;
a carrying arm having a first end and a second end; and
a carrying bracket for carrying the at least one cutting unit;
wherein the pivoting element at the connected first end of the first arm and the second end of the second arm is pivotally connected at a pivoting point at the second end of the end element of the stationary arm;
wherein the auxiliary pivotal element at the first end thereof is pivotally connected at a pivoting point at the first end of the end element of the stationary arm;
wherein the carrying arm at the second end thereof is pivotally connected at the second end of the first arm of the pivotal element;
wherein the carrying arm at the first end thereof is pivotally connected at the second end of the auxiliary pivotal element;
wherein the carrying bracket is mechanically connected to the carrying arm;
wherein the carrying bracket is carrying the at least one cutting unit; and
wherein the hydraulic actuator is configured to exert a force between the stationary part and a force exerting pivoting point of the pivoting element.

13. A suspension according to claim 1, wherein the plunger piston of the hydraulic actuator comprises a cylindrical element positioned between the second surface of the piston end element and the second axial end thereof, and wherein a dimension of the cylindrical element in a direction perpendicular to an axial direction of the plunger piston is smaller than a dimension, in the same direction, of the piston end element.

14. A suspension according to claim 1, wherein the second opening of the hydraulic actuator is positioned at an axial head end of the barrel, thereby allowing the hydraulic pressure into the third compartment of the interior of the barrel.

15. A suspension according to claim 1, wherein the second opening of the hydraulic actuator is positioned at the second axial end of the plunger piston, and wherein the plunger piston is provided with a channel which connects the second opening with the first surface of the piston end element, thereby allowing the hydraulic pressure into the second compartment of the interior of the barrel.

16. A suspension according to claim 1, wherein the hydraulic actuator further comprises at least one of a first connector for connecting to a hydraulic hose and a second connector for connecting to another hydraulic hose, wherein the first connector is positioned in the first opening, thereby allowing application of a first hydraulic pressure into the first compartment of the interior of the barrel, and the second connector is positioned in the second opening, thereby allowing an application of a second hydraulic pressure into at least one of the second compartment and the third compartment of the interior of the barrel via the plunger piston.

* * * * *